UNITED STATES PATENT OFFICE.

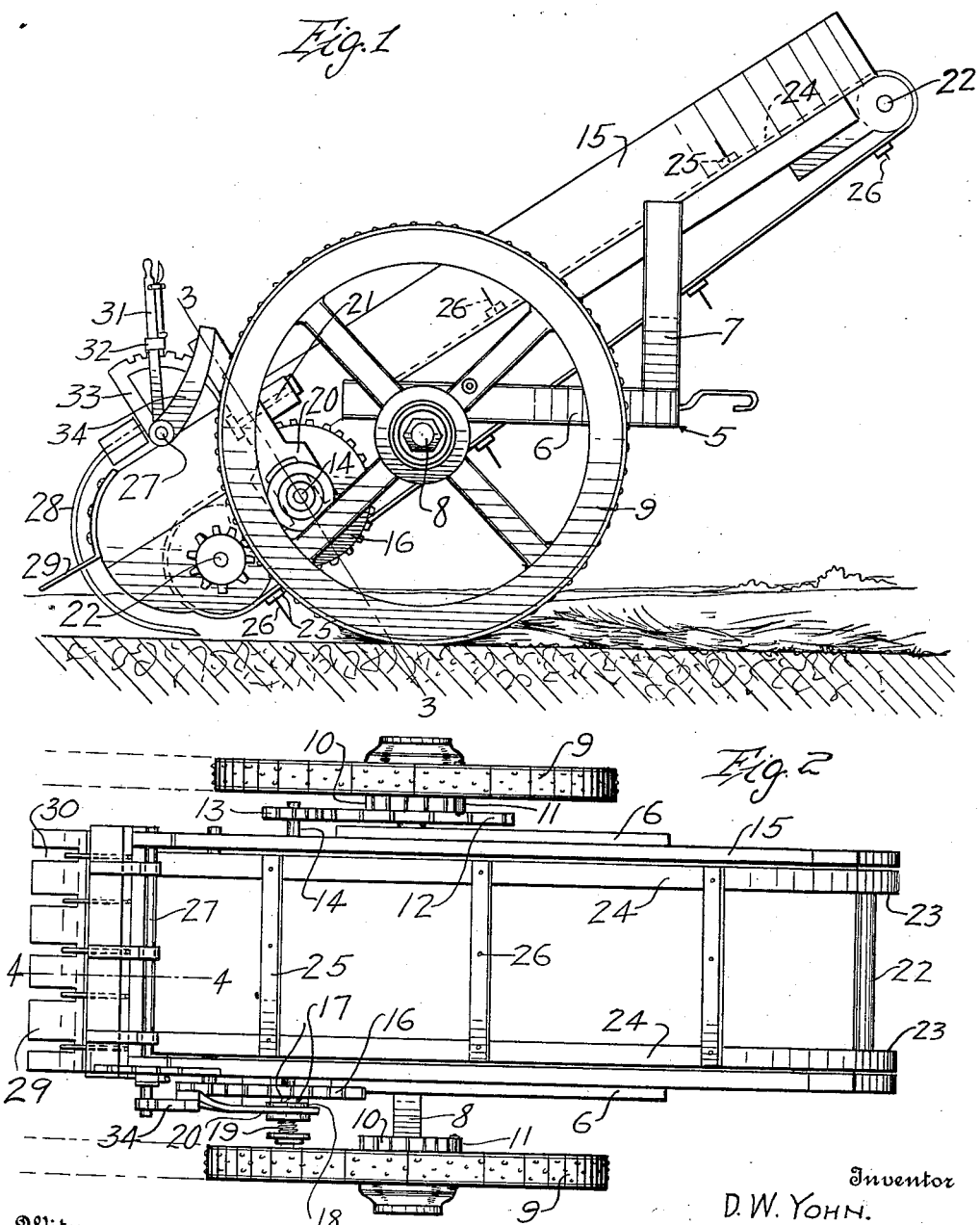

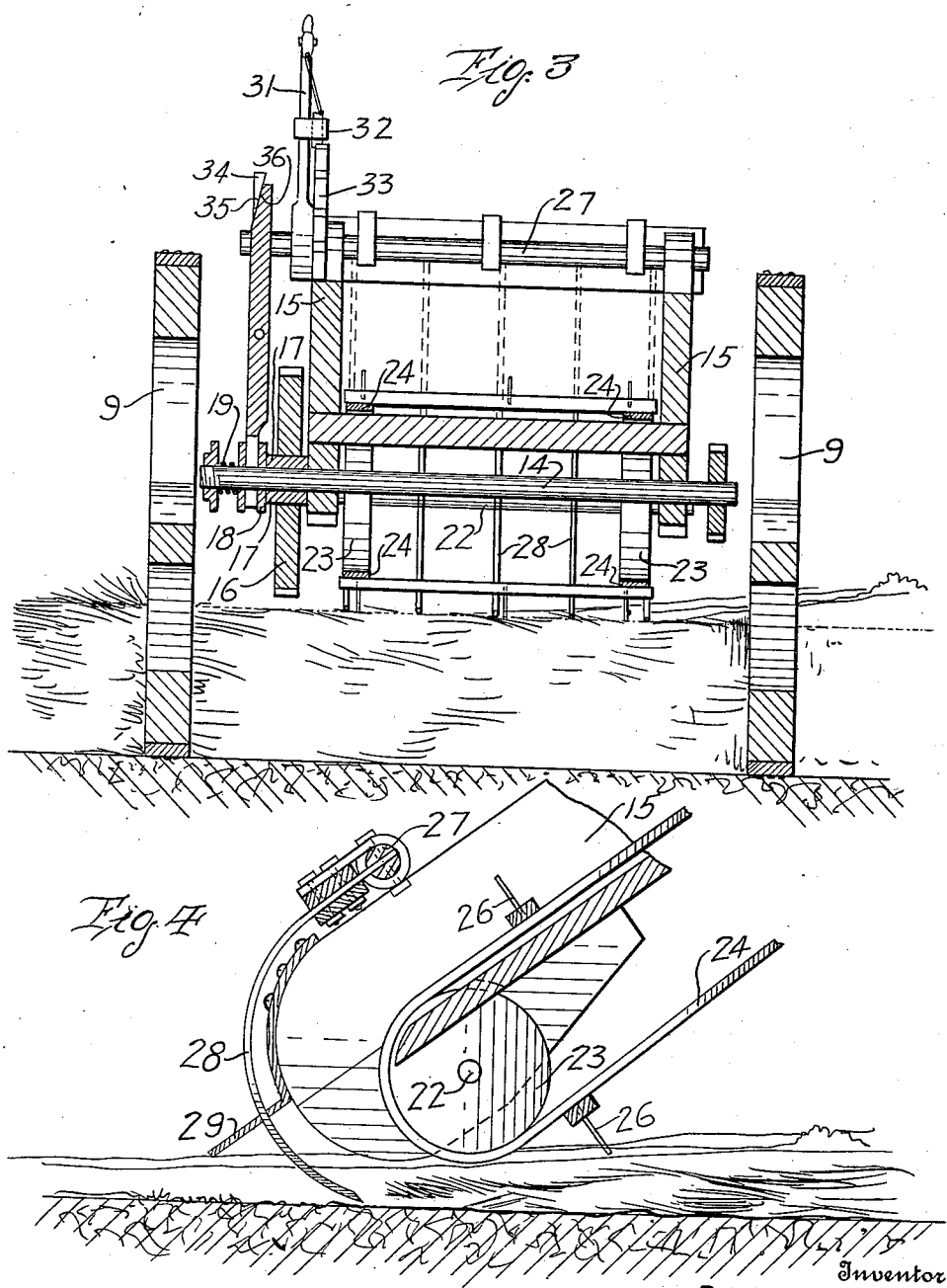

DAVID W. YOHN, OF MILLERSTOWN, PENNSYLVANIA.

HAY-LOADER.

1,087,624.  Specification of Letters Patent.  Patented Feb. 17, 1914.

Application filed April 16, 1913. Serial No. 761,645.

*To all whom it may concern:*

Be it known that I, DAVID W. YOHN, citizen of the United States, residing at Millerstown, in the county of Perry and State of Pennsylvania, have invented certain new and useful Improvements in Hay-Loaders, of which the following is a specification, reference being had to the accompanying drawings.

This invention relates to hay loaders and has for its primary object to provide a device of this character whereby hay, fodder and similar materials may be easily and quickly loaded upon a transporting vehicle.

Another object of the invention resides in the provision in combination with an inclined frame having an elevator mounted therein, of a rake pivotally mounted upon the lower ends of the frame, gearing for driving the elevator and means for simultaneously elevating the rake to an inoperative position and throwing the elevator drive out of operation.

Still another object of the invention is to produce a hay loader of the above character which consists of comparatively few parts of simple form, thereby conducing to a low cost of manufacture, and rendering the machine as a whole extremely durable, efficient and reliable in practical use.

With the above and other objects in view as will become apparent as the description proceeds, the invention consists in certain constructions, combinations and arrangements of the parts that I shall hereinafter fully describe and claim.

For a full understanding of the invention, reference is to be had to the following description and accompanying drawings, in which—

Figure 1 is a side elevation of a hay loader embodying the present invention; Fig. 2 is a top plan view thereof; Fig. 3 is a section taken on the line 3—3 of Fig. 1; and Fig. 4 is a section taken on the line 4—4 of Fig. 2.

Referring in detail to the drawings, 5 designates a supporting frame which includes parallel longitudinally extending side bars 6 and the vertically disposed bars or standards 7 arranged at the forward ends of said side bars. In the rear ends of the bars 6, the wheel axle 8 is mounted, said axle being provided with the usual ground wheels 9. To the axle 8 adjacent the inner faces of the wheel hubs, ratchet disks 10 are secured, with the teeth of which a spring-pressed pawl 11 engages. It being understood that the ground wheels are loosely mounted upon the axle and the pawls carried by these wheels, it will be obvious that said pawls coöperating with the ratchets lock the wheels upon the shaft for movement therewith in one direction while in the reverse or backward movement of the machine, the wheels will rotate upon said axle.

To the axle 8 adjacent one of its ends, a gear wheel 12 is fixed, and this wheel meshes with a pinion 13 fixed upon one end of a transverse shaft 14 journaled in suitable bearings provided upon the under side and at the lower end of the inclined elevator frame 15. This frame is suitably mounted upon the base frame 5. Upon the opposite end of the shaft 14, a gear wheel 16 is loosely mounted, said wheel being provided with clutch teeth 17 for engagement by the teeth of the sliding clutch member 18 which is keyed upon said shaft. This clutch member is normally and yieldingly held in engagement with the clutch face of the gear by means of a coil spring 19 on the shaft 14. The arms of a yoke 20 are engaged with the sliding clutch member to shift the same upon the shaft 14 out of engagement with the clutch face of the gear 16. This yoke is fulcrumed as at 21 upon a bracket secured to one of the side walls of the elevator frame 15.

In the upper and lower ends of the elevator frame 15, transverse shafts 22 are journaled, said shafts each being provided with a pair of sprocket wheels 23 which are located adjacent opposite sides of the frame. These sprocket wheels are traversed by the endless elevator chains 24, the upper stretches of which overlie the base wall or floor 15 of the elevator frame. These chains are connected by means of spaced transverse slats 25, said slats being provided with spaced fingers 26 for a purpose which will be later referred to.

A rock shaft 27 is journaled at its ends in suitable bearings provided upon the upper edges of the side walls of the elevator frame at the lower ends thereof. To this rock shaft, the upper ends of a series of curved rake tines 28 are fixed. To the sides of the elevator frame, the ends of a plate 29 are secured. This plate is provided with a rearwardly extending flange having spaced open ended slots 30 therein through which the rake tines extend when the rake is in its operative position. To one end of the rock shaft 27, a lever 31 is fixed, said lever carrying a spring pressed locking dog 32 for engagement with the teeth of a rack 33 suitably mounted upon one of the side walls of the elevator frame. An arm 34 is also fixed to the end of the rock shaft and is provided with a beveled face 35. This beveled face of the arm is adapted to slidably engage a beveled face 36 provided upon the upper end of the arm of the pivotally mounted yoke 19.

In the operation of the machine, the lower ends of the rake tines 28 are normally disposed adjacent to the ground surface so that in the forward movement of the machine, the hay or other material will be gathered thereby. The sliding clutch member 18 being in engagement with the clutch teeth of the gear 16, said gear is locked upon the shaft 14 to transmit rotation to the lower elevator shaft 21, whereby the elevator is driven in the proper direction, so that the finger carrying slats move upwardly over the base or floor of the elevator frame. The fingers on these slats move between the lower ends of the spaced rake tines 28 and thus gather the hay or fodder which is held thereby.

It is understood that the machine is attached in any preferred manner to the rear end of a vehicle into which the hay is dumped or discharged from the upper end of the elevator. When it is desired to stop the operation of the machine, it is only necessary for the operator to shift the lever 31 in the proper direction thereby rocking the shaft 27 and elevating the lower ends of the rake tines 28. The beveled face of the arm 34 engaging the beveled face 36 of the yoke arm in the downward movement of the arm 34 will shift the sliding clutch member 18 outwardly upon the shaft 14 against the action of the spring 19, thereby discontinuing the rotation of the lower elevator driving shaft 22.

From the foregoing, it is believed that the construction and manner of operation of my improved hay loader will be fully understood.

The machine is comparatively simple in its construction, and as the same may be easily and quickly controlled by the operator, comparatively little labor will be entailed in the loading of hay, fodder and similar materials. By providing the slotted guide plate 29 for the tines of the rake, said tines are held in proper spaced relation when in their operative position and relative transverse movement thereof prevented by the lower ends of said tines encountering stones or other obstacles in the path of movement of the machine.

While I have above described the preferred construction and arrangement of the several elements, it will be understood that the machine is susceptible of considerable modification in the form, proportions and arrangement thereof without departing from the essential features or sacrificing any of the advantages of the invention.

Having thus described the invention, what is claimed is:

In a hay loader, the combination with a wheel supported elevator and driving means therefor geared to the wheel axle, said means including a loosely mounted gear, of a spring pressed sliding clutch member for coöperating with the loosely mounted gear to lock the same and drive the elevator, a pivotally mounted yoke engaged with said clutch member, a rock shaft mounted upon the elevator frame, a plurality of curved tines fixed to said rock shaft, a lever secured to said shaft to rock the same, an arm fixed to said shaft and independent of the lever and having a beveled face, said yoke member being provided with an arm having a beveled face with which the beveled face of the arm on the rock shaft engages, whereby said yoke member is actuated when the shaft is rocked to elevate the rake tines to slide said clutch member and release the loose gear whereby the operation of the elevator is discontinued.

In testimony whereof I hereunto affix my signature in the presence of two witnesses.

DAVID W. YOHN.

Witnesses:
LAURA E. WOLFE,
HATTIE E. MOTTER.

---

Copies of this patent may be obtained for five cents each, by addressing the "Commissioner of Patents, Washington, D. C."